United States Patent Office 3,618,300
Patented Nov. 9, 1971

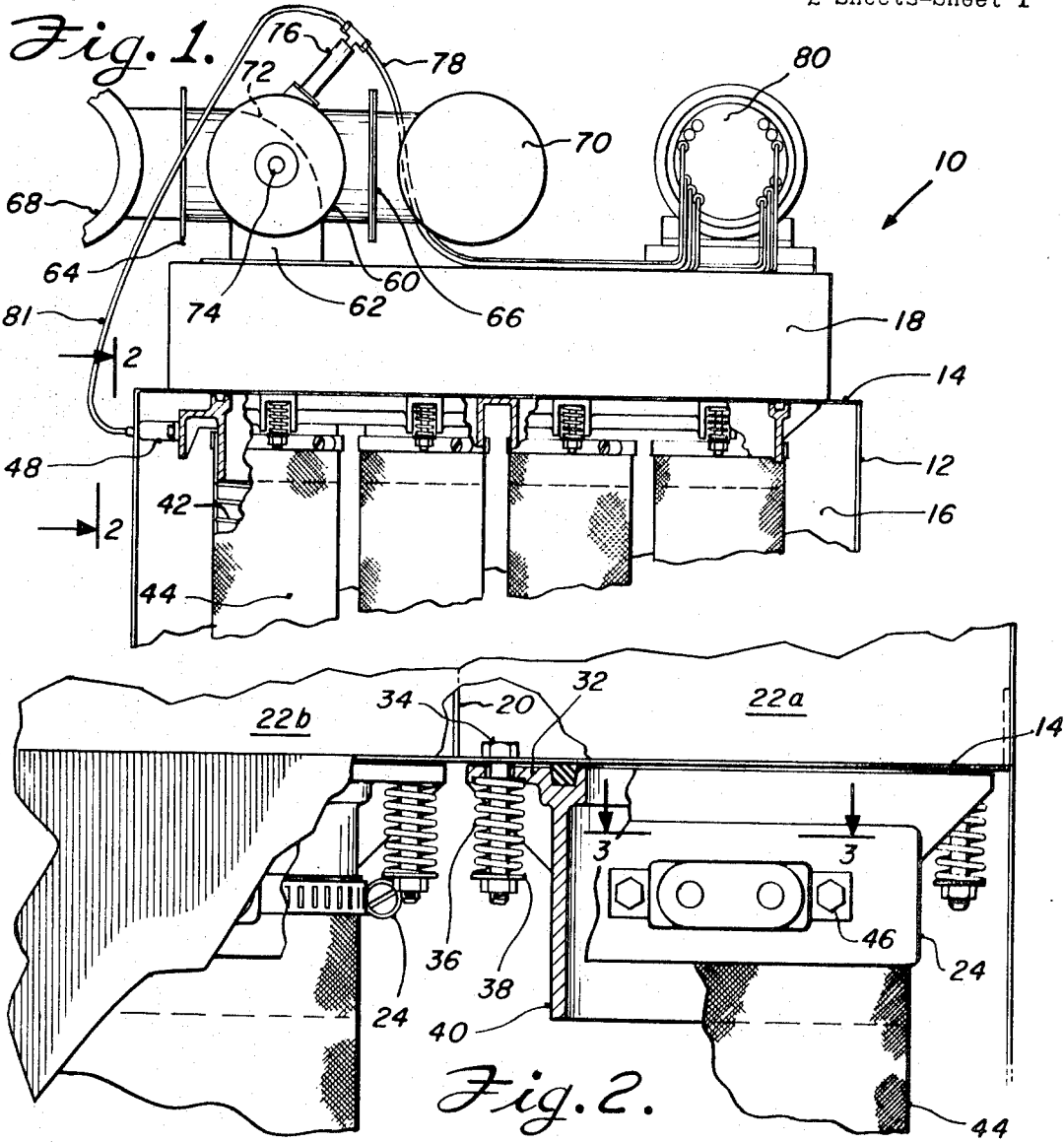
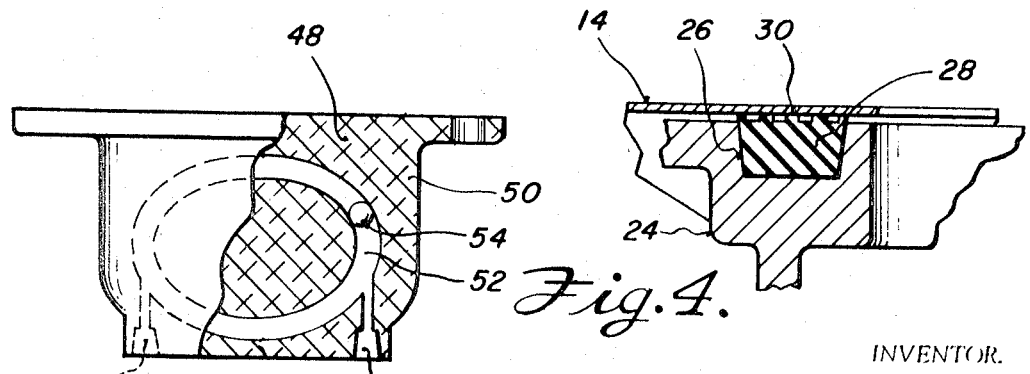

3,618,300
DUST COLLECTION
Josef Pausch, Hopkins, Minn., assignor to Aerodyne Machinery Corporation, Hopkins, Minn.
Continuation of application Ser. No. 619,868, Mar. 1, 1967, which is a continuation of application Ser. No. 372,242, June 3, 1964. This application Dec. 2, 1968, Ser. No. 781,702
Int. Cl. B01d 46/04
U.S. Cl. 55—273                 2 Claims

ABSTRACT OF THE DISCLOSURE

A dust filtering system in which the flexible porous filtering surface is supported on a skeletal frame, and in which the skeletal frame is resiliently mounted so that vibrational movement imparted thereto may be transmitted in a relatively undampened condition to all portions of the porous filtering surface.

CROSS REFERENCE TO RELATED APPLICATIONS

This application is a continuation of application Ser. No. 619,868, filed Mar. 1, 1967, now abandoned, which was, in turn, a continuation of application Ser. No. 372,242, filed June 3, 1964, now abandoned. It constitutes a modification of the invention disclosed in the application of Pausch et al., Ser. No. 282,071, filed May 21, 1963, now abandoned, which application is assigned to the assignee of the instant application.

This invention relates to improvements in the separation by filtration of dust particles from a gas, such as air. More particularly, the invention is concerned with the dislodgment of the accumulated dust particles from the filtering media.

In the prior art, it has been proposed to remove dust from gases such as air by the use of filter tubes composed of porous fabric, and to dislodge and collect the accumulated dust. An example of one mode used in the prior art for dislodging the collected dust is disclosed in Pat. No. 1,509,912, wherein the filtering tubes are partially collapsed, and additionally, they are shaken or vibrated by continuously shaking the supporting structure by means of eccentrically operated members. Another prior mode of dislodging the dust from the filter elements is illustrated in Pat. No. 1,168,543, wherein the flow of air is reversed at periodic intervals and concurrently the tubes are stretched and relaxed. While these procedures and apparatus may be satisfactory for some materials, they are not universally applicable for all types of dust particles.

I have found that dust particles which are capable of being suspended in a gas such as air, and which may be removed therefrom by filtration, differ widely in their capacity of adhering to the porous filter. Particles differ considerably in size, and their adhering characteristics differ considerably, according to the solid material from which they are derived, and their adhering characteristics may also be affected by variations in the humidity of the gas in which they are suspended.

I have found that because the characteristics and qualities of dust particles composed of different materials vary widely in their ability to adhere to the filtering surfaces, that the procedures for removing these particles must also be subject to variation. It is accordingly proposed to provide variable conditions for the treatment of the filtering surfaces to dislodge the dust particles therefrom. This may be accomplished by providing variation in the rate of vibration or movement of the filtering surfaces, and also varying the time interval between which the cleaning operation is conducted. These steps may be combined with a procedure wherein cleaned or filtered air is passed in a reverse direction through the filter tubes, and in such a manner as to produce a pneumatic shock within the tubes, together with vibration at a selected rate to remove the accumulated dust particles.

An object of the invention is to provide a process for vibrational dislodgement of dust particles from a porous filtering media by varying one or more conditions of the vibrational treatment of the media until a specific condition is establishd which is optimum for the dislodgment of the specific dust particles.

Another object is to provide a process for the vibrational dislodgment of dust particles from a porous filter element of a dust collector by varying the rate of vibration of the element until a rate is obtained which is optimum for the dislodgment of the particular particles.

A further object is to provide in a dust collector, embodying porous filter tubes, a resilient mounting for the tubes, together with a vibrating means which is adjustable as to the rate of vibrations so as to produce a rate of vibration which is optimum to dislodge dust particles from the tubes during the cleaning thereof.

Other and further objects may become apparent from the following specification and claims, and in the appended drawings in which:

FIG. 1 is a side elevation of a portion of a dust collector with certain parts broken away to show interior construction;

FIG. 2 is an enlargment of a portion of the structure taken on the line 2—2 of FIG. 1;

FIG. 3 is a plan view with parts broken away, showing a portion of a vibrator illustrated in FIG. 1;

FIG. 4 is an enlarged detail view of a part of the structure shown in FIG. 1;

Figure 6:
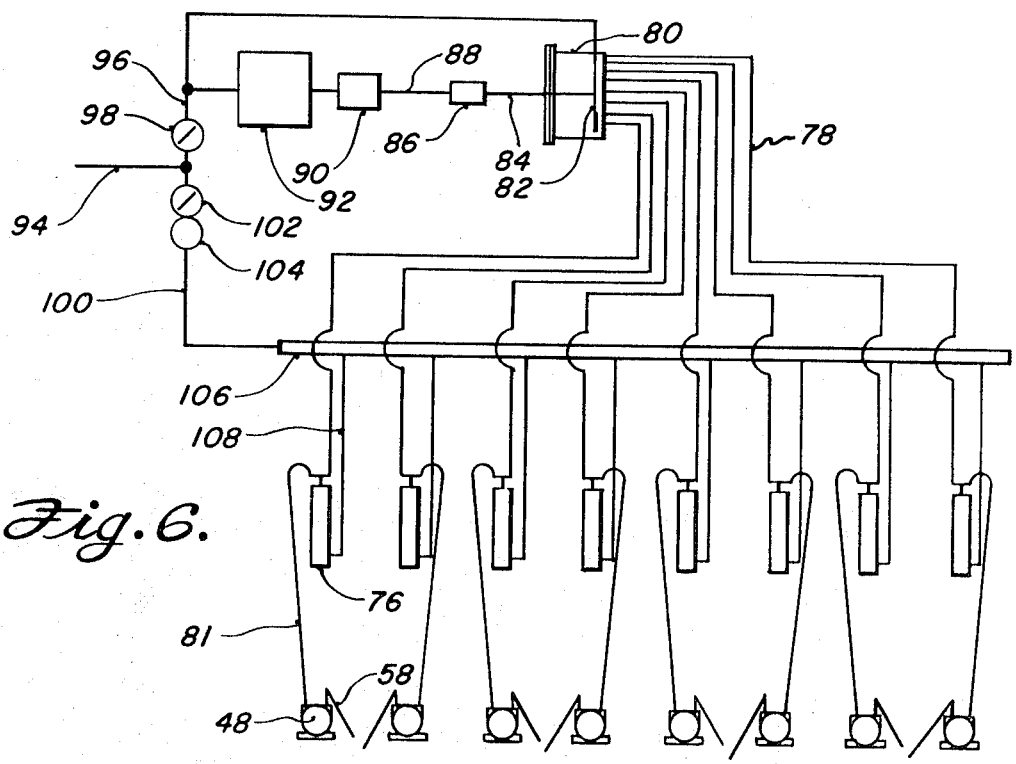
FIG. 6 is a diagram of the control elements used for controlling the operation of the dust collector shown in FIG. 1.

Referring now to the several views of the drawing, the invention will be described in detail.

Referring first to FIG. 1, general numeral 10 indicates in its entirety the upper portion of a dust collector or air filter. The filter 10 is composed of a casing 12, which is closed on all of its sides, and is provided on its lower extremity with a conventional dust receiving hopper, not shown, and a conventional inlet opening for dust ladened air, which is also not shown. A general partition 14 extends transversely within the interior of casing 12 and divides the latter into a lower filtering chamber 16, and an upper filtered or clean air chamber 18. The filtered air chamber 18 contains several vertical partitions 20, one of which is shown in FIG. 2, that divide the chamber 18 into a series of laterally contiguous individual plenums, that are designated in FIG. 2 by the reference characters 22a and 22b.

Figure 5:
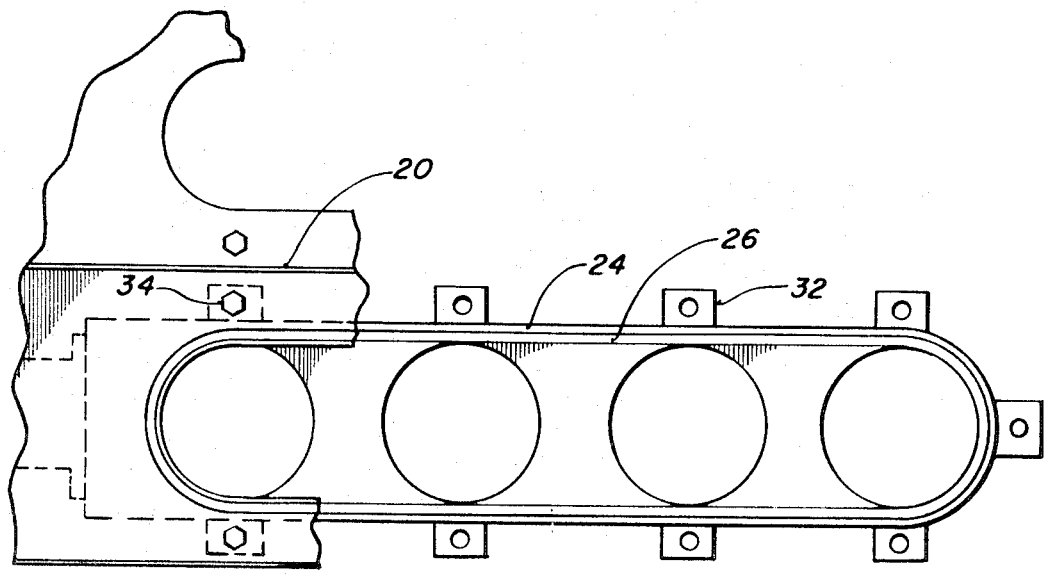
FIG. 5 is a plan view of a part of the structure shown in FIG. 1.

Disposed on the underside of the partition 14, and extending parallel with each of the plenums 22a and 22b, and as best seen in FIG. 5, taken in conjunction with FIGS. 1 and 2, is a casting 24, which on its upper surface is formed with a continuous recess 26, within which is disposed a heavy resilient gasket 28 formed of rubber or a rubber-like composition. On its upper surface, the gasket 28 contains a multiplicity of spaced ribs 30 that project above the upper surface of the casting 24 and separate said casting from the under surface of the partition 14. The casting 24 also has formed thereon a multiplicity of apertured lugs 32 by which the casting can be secured by bolts 34 to the partition 14. In surrounding relationship with each of the bolts 34 is a coil spring 36 which abuts the under surface of each of the lugs 32, while the lower end of each of said springs 36 is held on the respective bolt 34 by means of a washer 38. Depending from the lower surface of casting 24 are a series of spaced annular flanges 40.

Secured within each of the flanges 40, and depending therefrom is a cylindrical wire frame 42, see FIG. 1, about which is a porous fabric filter tube or sock 44 that is closed on its lower end. There are four such filter elements 44 disposed in parallel relationship with each other, with the interiors thereof in communication with a single plenum 22. The exterior surfaces of all of the filter elements 44 are in common communication with the interior of casing 12. Generally speaking, the dust collector 10 is composed of multiples of two or more plenums, each having four filter elements communicating therewith.

Disposed within the interior of casing 12, and secured to each of the castings 24 by bolts 46, is a mechanical vibrator designated by reference numeral 48, and shown somewhat in detail in FIG. 3. The vibrator 48 is a commercial product and is composed of a casting 50 containing within its interior an eliptical race 52 within which is disposed a spherical member 54. The casting 50 contains an inlet opening 56, which communicates with the race 52 and is adapted for connection to a source of compressed air or other fluid. The casting also contains an outlet or discharge port 58 that extends from the race 52.

Disposed on the upper surface of each of the plenum chambers 22 is a valve casing 60 having a first opening 62 that communicates with the interior of the plenum chamber, and two oppositely disposed lateral openings 64 and 66. The opening 64 communicates with a manifold 68 that is coupled to an exhausting blower, not shown, while the opening 66 communicates with a second manifold 70, which may be open at one end to ambient or clean air, or alternately, may also be coupled to a blower, not shown, which is, in turn, in communication with a source of clean air or gas. Within the interior of the valve casing 60 is an axially rotatable valve member 72 provided with a curved surface that forms a right angle or 90° passage between the opening 62 and one of the openings 64, 66. The valve member 72 is supported for axial rotation on a journal 74, and is rotatably actuated by a pneumatic motor 76. The motor 76 receives compressed air through a conduit 78 from a compressed air distributor 80. Extending from motor 76 to each vibrator 48 is a conduit 81.

Referring now to FIG. 6, is shown the means for controlling the motors 76, and the vibrators 48 of a multiple plenum dust collector. The distributor 80 is composed of a closed casing which is coupled to a multiplicity of tubes or conduits designated collectively by the reference character 78 to a multiplicity of motors designated collectively by reference character 76, and extending from each motor 76 to the respective vibrators 48 are the branch conduits designated collectively at 81. Within the interior of the casing 80 is a plate 82 that contains an aperture (not shown) which sequentially registers with openings to each of the conduits 78 consecutively during a single rotation of the plate. The plate 82 is coupled to a drive shaft 84, and the rate of rotation of said shaft 84 is controlled by a variable speed drive 86 which, in turn, is coupled by a shaft 88 to a reduction gear mechanism 90 driven by a motor 92.

A conduit 94 extends from a source of compressed fluid such as air, and is provided with a branch 96, which extends to the distributor 80 and contains a pressure regulating device 98. A second branch 100, containing a pressure regulating device 102, and an oil distributor 104 extends to a manifold 106. From the manifold 106, conduits designated collectively as 108, extend to each of the several motors 76.

The operation of the invention will now be explained. The dust collector 10 must be composed of at least two groups of the porous filter elements 44, and in which each group is in communication with a separate plenum such as 22a and 22b, separated by the divider plates 20. In the control system illustrated in FIG. 6, there are eight such groups. As disclosed in FIG. 1, each group is composed of four filter elements 44, all having the inner sides in communication with one common clean air plenum 22. It is the intent and purpose of the apparatus to provide continuous filtration of dust ladened air by providing means whereby one common set or group or filter elements may be undergoing cleaning, while the remaining groups continue to filter the dust ladened air.

The dust ladened air is admitted into the casing through a lower opening, not shown, by the suction or negative pressure of a blower communicating with the manifold 68, and thence through the individual valves 72, with each of the plenum chambers 22. Under these circumstances, the dust is segregated within the container 12, and collected on the outer surface of the fabric covering 44 of each element, while the filtered air passes through the fabric to the plenum chamber 22, and thence through the valves 72 with the latter in the position shown in FIG. 1, to the exhaust manifold 68.

To control the sequential cleaning operation of each set of the porous filter elements, compressed air is provided to conduit 94, and passed to the branches 96 and 100. The pressure regulator 98 is adjusted to admit compressed air through the branch 96 to the distributor 80 at a predetermined pressure, which, for example, might be 60 p.s.i. The regulator 102 is set at a lower pressure, and controls the return of a piston in motor 76.

Motor 92 through the gear reduction element 90 rotates the shaft 88 at a predetermined speed, and by means of the adjustable variable speed drive 86, the shaft 84 is driven at a predetermined very slow rate to cause rotation of the apertured plate 82 with respect to the multiplicity of openings in the base of the casing which connect with the several conduits 78. The speed of rotation of the plate 82 fixes the rate at which each set of filter elements are cleaned, by operating the individual motor 76 to reverse the position of the valve member 72 with respect to openings 64 and 66 with respect to each plenum. When compressed air passes through each of the conduits 78, it energizes a piston within each motor 76 and concurrently therewith, the compressed air is bypassed through conduit 81 to the respective vibrator 48, from whence the air is exhausted through the ports 58.

By reason of maintenance of a negative pressure within the manifold 68, the direction of the flow of air is towards manifold 68, and the dust ladened air is filtered. On the other hand, during the cleaning phase for each plenum, value 72 is reversed to the position of opening 66, and the pressure within the manifold 70, whether it be at barometric pressure or at a higher pressure, by reason of the operation of a blower, which is feeding air into this manifold, such pressure as exists therein is nevertheless substantially more than that previously existing within the interior of the plenum, and the filtering elements. Therefore, when the valve member 72 is rotated from its connection with the low pressure manifold 68 to the high pressure manifold 70, it not only produces a change of direction of air flow within the plenum and the porous elements, but it also produces a rapid change in pressure which causes the fabric layer 44 to be suddenly inflated. This combination of actions thus produces a pneumatic shock to the filtering elements, causing at least a part of the accumulated dust layer to be forcibly expelled or dislodged. Concomitant with the rotation of the valve member 72, the accompanying vibrator 48 is actuated and the compressed air causes the sphere 54 to be rapidly driven through the race 52, thereby establishing a series of high speed vibrations which are transmitted to the casting 24 to and through the interconnected wire frame 42 to the porous filter tube 44 that circumscribes said frame and by reason of the resilient connections through the coil springs 36 and the resilient gasket 28 with its fingers 30 to all of the filter elements of each group. The only point of connection of each of the filter elements is through the aforementioned resilient connection, and therefore, the entire filter element will vibrate in two directions, and the extent of movement is multiplied as each tube extends downwardly from the connections. The greatest extent of movement of any part of the tube will, in general, be less than one-eighth of an inch, but this is sufficient to quickly dislodge most of the dust particles.

By adjustment of the pressure regulator 98 in branch 96, the number vibrations imparted to each set of filter elements by the vibrator 48 may be widely adjusted, as for example, from as low as 1500 or less vibrations per minute to 75,000 or more vibrations per minute, but in general, it has been found that a range of about 6,000 to 15,000 vibrations per minute are satisfactory for dislodging most forms of dust particles. The characteristics and qualities of dust particles of different materials will very considerably, and all will not react according to a common condition. Thus, where a high rate of vibration might be desirable to dislodge particles of dust composed of one material, or one humidity condition, a lower rate of vibration may be optimum for dislodging particles of another material, or a different humidity condition. These varying conditions do not follow a simple rule, but may be easily determined by experimentation.

In practical application, a manometer or pressure gauge is operably connected between the interior of casing 12, and one of the clean air plenums 22, or related areas on the opposite sides of the plate 14 to measure pressure differential. If the pressure differential is excessive, this indicates difficulty in filtration, or the excessive collection of dust on the filter elements. The frequency at which each set of elements may be cleaned is controlled by the variable speed drive 86, and if that form of adjustment is not satisfactory, then the rate of actuation of the vibrators may be adjusted through tht pressure regulator 98, and the operator will normally experiment by alternately increasing and decreasing the pressure of the control air flowing to the distributor 80.

The air flowing through branch 100 to the manifold 106 and the separate conduits 108 to each of the motors 76 provides for return of the piston within the motor 76 to its normal position, so as to return the valve element 72 to its dotted line position, shown in FIG. 1. The pressure in conduit 100 must be less than that in branch 96, and this pressure is controlled by the regulator 102. Element 104 is provided to introduce lubricant into the system for the operation of the several motors 76.

The foregoing procedures are now illustrated by the following specific examples.

EXAMPLE I

An 8 plenum unit of 4 porous filter elements composed of 18 oz. Dacron felt, making a total of 500 square feet of cloth area was used to filter an air-dust mixture in a feed mill grinding soya bean meal. Particles size of the dust was 80% 15 micron or larger, and 20% less than 15 micron size. Air volume handled was 6500 c.f.m. and the volume of dust loading was approximately 6 pounds per minute. Pressure loss through the cloth was measured with a water gauge.

| Time: | Pressure drop, inches |
|---|---|
| Start | 0.6 |
| 20 minutes | 1.25 |
| 1 hour | 2.0 |
| 1½ hours (plugged) | 3.0 |

The system was then adjusted in the manner described heretofore to perform a cleaning cycle for each plenum section once every 10 minutes, and concomitant with each cleaning cycle, the vibrator was set to vbirate each set of filters at 6,000 vibrations per minute.

Maximum pressure drop was 1" for remainder of day.

EXAMPLE II

The same conditions as set forth in Example I, except that the volume of dust loading was increased to 11 pounds per minute.

| Time: | Pressure drop, inches |
|---|---|
| Start | 0.6 |
| 20 minutes | 2.5 |
| 1 hour (plugged) | 3.5 |

The cleaning cycle was then adjusted to clean each plenum section once every 4 minutes, and the rate of vibration was set at 6,000 vibrations per minute.

The maximum pressure drop was 1" for remainder of day.

EXAMPLE III

The same unit described in Examples I and II was applied for the filtration of alfalfa dust. Particle size, 30% 10 micron or larger, and 70% smaller and 10 micron. Volume of dust loading was 72 pounds per minute. A cleaning cycle was performed once every 4 minutes.

Vibration during cleaning cycle was 15,000 per minute.

| Time: | Pressure drop, inches |
|---|---|
| Start | 0.6 |
| 5 minutes | 1.5 |
| 10 minutes (plugged) | 3.0 |

Vibration was then adjusted to 13,500 per minute.

| Time: | Pressure drop, inches |
|---|---|
| Start | 0.6 |
| 5 minutes | 1.0 |
| 10 minutes | 1.2 |
| 30 minutes (plugged) | 3.0 |

Vibration setting was then reduced to 10,900 per minute.

| Time: | Pressure drop, inches |
|---|---|
| Start | 0.7 |
| 5 minutes | 0.8 |
| 10 minutes | 0.8 |
| 30 minutes | 1.0 |
| 2 hours | 1.0 |
| 4 hours | 1.0 |

EXAMPLE IV

A 4 plenum apparatus embodying 180 square feet of cloth area was used to filter iron sulfate dust from air. The rate of filtration was 2800 c.f.m. The solids had a true density of 3.1 grams per cc. with 40% of the particles being 40 microns or larger, and 60% less than 40 microns in size. The volume of dust loading was 4 pounds per minute. The apparatus was set to produce a cleaning cycle once every 4 minutes, and the vibrator was set to produce 10,900 vibrations per minutes during each cleaning operation.

| Time: | Pressure drop, inches |
|---|---|
| Start | 0.8 |
| 5 minutes | 1.0 |
| 20 minutes | 1.5 |
| 1 hour | 2.0 |
| 2 hours (plugged) | 3.5 |

The vibrator was then set to produce 14,250 vibrations per minute during each cleaning cycle.

| Time: | Pressure drop, inches |
|---|---|
| Start | 0.8 |
| 5 minutes | 0.8 |
| 1 hour | 1.0 |
| 2 hours | 1.0 |

The foregoing test demonstrate that the maximum possible cloth to air ratio is a variable influenced by particle size and shape, the quantity of dust loading, and moisture and relative humidity of dust-air mixture. The pressure drop through clean cloth is an approximate proportional function of the velocity. For a given dust mixture, the dust concentration influences the filtering capacity.

The test demonstrate that variations in the quantity of dust passing to the separator requires a downward adjustment of the frequency of the cleaning cycle. As a general rule, low density products require a medium vibration rate, and depending upon particle size, in the range of 5,000 to 11,000 vibrations per minute. High density products, such as minerals, and products having an extremely fine particle size, normally require a somewhat higher rate of vibration, but as the tests demonstrate, a degree of adjustment may be required for each product, and additional adjustments of either the cleaning cycle or the rate of vibration may be required for substantial changes in moisture content of the dust or dust-air mixture.

The value of the present invention is in the provision of adjustability of 2 basic conditions in the dry filtration of dust; a variation in the frequency of the cleaning operation, and a variation in the rate of vibration of the filters. The provision of adjustment of these two conditions makes the system applicable to many and varied types of usage, and therefore, adaptable to most industrial dust filtration operations.

By observation and tests, it has been determined that the present invention has made possible the handling of dust mixtures which could not heretofore be separated by filtration. Also, it has been found that the efficiency of separation of known forms of dust-air mixtures has been greatly increased, and seasonal variations which may be caused by variations in humidity can be easily adjusted.

It should be understood that the appended drawings are merely illustrative of an embodiment of the invention, that the unit may be expanded to include a large number of groups of filtering elements, and that the invention is not limited to the specific disclosure, but is defined in the terms of the appended claims.

I claim:

1. In a dust collector embodying a container, dividing means carried by said container for separating the interior thereof into a first chamber for receiving dust-laden gas and a second chamber for relatively clean gas, said dividing means formed with a plurality of gas passages therethrough, partition means located in said second chamber and between said gas passages and sub-dividing said second chamber into independent plenums, a plurality of cylindrical wire frames each aligned with one of the passages through said dividing means, a porous flexible filter tube surrounding each frame and in substantial contact therewith disposed within said container, each of said tubes having one surface thereof in communication with one of said plenums and the other surface in communication with said first chamber and adapted to receive an accumulation of dust particles thereon, the improvement which comprises means supporting each of said frames in alignment with one of said passages and in vibration isolating with respect to said dividing means and said container, including rigid frame mounting means, first resilient means secured to and extending from said rigid frame mounting means for spacing engagement with said dividing means, and further resilient means continuously urging said rigid frame mounting means toward said dividing means to maintain said engagement while enabling limited transverse motion of said rigid frame mounting means relative to said dividing means, a plurality of variable mechanical vibration means each operatively connected to one of said rigid frame mounting means independent of said container and said dividing means for imparting to the respective rigid frame mounting means vibrational movement within the range of substantially 5,000 to 75,000 vibrations per minute through each of said frames at a substantially undiminished amplitude to substantially all portions of the respective filter tubes, means causing flow of air through each of said passages, means for adjustably modifying said flow with respect to each plenum so as to cause particles to become detached from said tubes during cleaning cycles thereof, with variable frequency of occurrence, means for varying the frequency of said vibration means, and means simultaneously energizing said vibration means and initiating a cleaning cycle of one tube while the other tube continues normal filtration.

2. In a dust collector embodying a container, dividing means carried by said container for separating the interior thereof into a first chamber for receiving dust-laden gas and a second chamber for relatively clean gas, and having a gas passage therethrough, a cylindrical wire frame aligned with said passage, a porous flexible filter tube surrounding said frame and in substantial contact therewith disposed within said container, said tube having one surface thereof in communication with said second chamber and the other surface thereof in communication with said first chamber and adapted to receive an accumulation of dust particles thereon, the improvement which comprises means supporting said frame in alignment with said passage and in vibration isolating relationship with respect to said dividing means and said container, including rigid frame mounting means, first resilient means secured to and extending from said rigid frame mounting means for spacing engagement with said dividing means, and further resilient means continuously urging said rigid frame mounting means toward said dividing means to maintain said engagement while enabling limited transverse motion of said rigid frame mounting means relative to said dividing means, mechanical vibration means operatively connected to said rigid frame mounting means independent of said container and said dividing means for imparting vibrational movement within the range of substantially 5,000 to 75,000 vibrations per minute through said rigid frame mounting means at a substantially undiminished amplitude to substantially all portions of said filter tube.

References Cited

UNITED STATES PATENTS

| | | | |
|---|---|---|---|
| 1,124,574 | 1/1915 | Zimmer | 55—293 |
| 1,259,008 | 3/1918 | Fraser | 55—291 X |
| 1,738,717 | 12/1929 | Matlock | 55—304 X |
| 1,751,138 | 3/1930 | Eiben | 55—300 |
| 2,094,775 | 10/1937 | Bedford | 55—379 X |
| 2,318,395 | 5/1943 | Hornbrook | 55—273 |
| 2,477,623 | 8/1949 | Kling | 55—341 |
| 2,633,206 | 3/1953 | Bruckner | 55—273 X |
| 2,731,107 | 1/1956 | Hersey, Jr. | 55—293 X |
| 2,732,912 | 1/1956 | Young | 55—293 X |
| 2,854,091 | 9/1958 | Roberts et al. | 55—292 X |
| 2,902,161 | 9/1959 | Anderson | 210—388 |
| 2,976,953 | 3/1961 | Haas et al. | 55—379 X |
| 3,097,936 | 7/1963 | Lincoln | 55—302 X |
| 3,243,940 | 4/1966 | Larson | 55—96 |

FOREIGN PATENTS

| | | | |
|---|---|---|---|
| 240,230 | 8/1962 | Australia | 55—292 |
| 661,870 | 4/1963 | Canada | 55—292 |
| 317,078 | 10/1929 | Great Britain | 55—291 |
| 339,828 | 8/1936 | Great Britain | 55—305 |
| 731,794 | 6/1955 | Great Britain | 55—304 |

DENNIS E. TALBERT, JR., Primary Examiner

U.S. Cl. X.R.

55—283, 284, 291, 300, 302, 304, 341, 374, 379, 502, 508, 509; 210—332; 259—1